Patented June 13, 1950

2,511,603

UNITED STATES PATENT OFFICE 2,511,603

RESIN ACID NITRILE

Harold M. Spurlin, Marshallton, Del., assignor to Hercules Powder Company, Wilmington, Del., a corporation of Delaware No Drawing. Application October 28, 1948, Serial No. 57,136

5 Claims. (Cl. 260—100)

This invention relates to an improved process for the preparation of resin acid nitriles and more particularly to a process for preparing the nitrile of a disproportionated rosin from a natural rosin.

Rosin acid nitriles have been prepared from the rosin acids of natural rosin or esters thereof by heating the rosin, or a solution of the rosin, in an inert solvent with gaseous ammonia in the presence of a dehydration catalyst such as silica gel. The product of this reaction is the nitrile of the natural rosin acids; i. e., it contains for the most part the abietic, or primaric-type nucleus. While having many valuable properties, these nitriles of natural rosins have the disadvantages inherent in the relatively unstable abietic-type nucleus. Furthermore, the yield of nitrile is low, a large amount of rosin oil being obtained by the decarboxylation which occurs during the reaction.

Now in accordance with this invention it has been found that the nitrile of a disproportionated rosin may be obtained by heating a natural rosin in the liquid phase with gaseous ammonia in the presence of a noble metal hydrogenation catalyst. The nitrile of a disproportionated rosin combines the advantageous properties of the nitrile group with a stabilized rosin nucleus and consequently can be used in many applications where a natural rosin nitrile is not suitable. Furthermore, it is lighter in color and, being more stable, is easier to purify. To obtain the nitrile of a stabilized rosin directly from a natural rosin is both surprising and desirable. The process of this invention is not only advantageous over the prior art in that it yields a more desirable product, but also in that there is less decarboxylation and other side reactions, and consequently the nitrile is produced in a greater yield.

The following examples illustrate the preparation of the nitrile of a disproportionated rosin from a natural rosin in accordance with this invention. All parts and percentages are by weight unless otherwise indicated.

Example 1

A charge of 3180 parts of N wood rosin was melted in a reaction vessel which was equipped with a sparge tube, through which anhydrous ammonia was introduced, a thermometer, and, as a vertical column, a spiral reflux condenser heated by passing steam through the coils, the top of the column being connected to a condenser. An amount of 5% palladium-on-carbon catalyst was added to give a rosin to palladium ratio of 50,000:1. Ammonia then was sparged through the molten rosin at a rate of 4.8 cu. ft./hr. while the temperature was raised to 325° C. in 1.5 hours. The ammonia sparge was continued at the same rate until the acid number of the final product was 5 or less, which required 16.5 hours, the reaction mixture being held at 325° C. ± 10° C. The vertical column was held at a temperature of 100°–105° C. during the reaction. A total of 277 parts of water and 343 parts of oil were collected during the reaction period. The crude product was neutralized by the addition of excess lime and then was distilled. A yield of 60.8% nitrile (based on the abietic acid) was obtained and as by-products 20.7% oil and 17% residue. On analysis the nitrile was found to contain 42% dehydroabietonitrile and no abietonitrile.

Example 2

Example 1 was repeated except that the temperature was held at 260° C. for 5 hours and then was raised to and held at 325° C. ± 10° C. for 15 hours. The crude nitrile was distilled as before, a yield of 59% was obtained, the product containing no abietonitrile and 42% dehydroabietonitrile. The residue amounted to 17.3% and the total amount of oil which distilled during the reaction and that obtained on distillation of the nitrile was 21.4%.

The nitrile of a disproportionated rosin may be prepared in accordance with this invention directly from a natural rosin by heating the latter with ammonia in the presence of a noble metal hydrogenation catalyst. Any natural rosin as, for example, a wood or gum rosin may be used as the starting material. If desired, the rosin may be refined by heat treatment or otherwise purified prior to its use by any of the usual methods as, for example, by crystallization, by means of a selective solvent such as furfural or phenol, or by treatment with an adsorbent such as fuller's earth or activated carbon. In place of the rosin-containing material, any of the rosin acids contained therein as, for example, abietic acid, levo-pimaric acid, etc., may be used as the starting material.

When the nitrile formation reaction is carried out in the presence of a noble metal hydrogenation catalyst, the carboxyl group of the rosin acid is converted to the nitrile group and, at the same time, the nucleus of the rosin acid undergoes disproportionation so that the product is the nitrile of disproportionated rosin rather than the nitrile of a natural rosin. By disproportionation is meant the intra- and intermolecular rearrangement of the hydrogen atoms in the rosin nucleus with no change in the carbon skeleton, which rearrangement occurs when a rosin material is contacted with a hydrogenation catalyst at elevated temperatures in the absence of added hydrogen. This reaction is frequently termed dehydrogenation. However, it is preferably termed disproportionation since, in addition to dehydrogenation, hydrogenation also occurs. The hydrogen lost in the dehydrogenation of part of the rosin acids adds to another portion of the rosin acids so that the final product contains both dehydro- and hydro-rosin nuclei. That disproportionation does occur when the nitrile reaction is carried out in the presence of a noble metal hydrogenation catalyst is demonstrated by the foregoing examples wherein the nitrile produced contained 42% dehydroabietic nuclei and no abietic-type nuclei, indicating that all of the rosin acid had undergone disproportionation.

In carrying out the simultaneous disproportionation and nitrile reaction it has been found that a noble metal hydrogenation catalyst should be used to bring about the disproportionation reaction in the presence of the ammonia required for the nitrile formation. Any of the noble metals may be used as the catalyst as, for example, a palladium or platinum catalyst. The noble metal catalyst may be a supported- or unsupported-type catalyst. Any inert carrier may be used to support the catalyst as, for example, granular alumina, fibrous asbestos, carbon, etc. When a supported catalyst is used an amount of the palladium or platinum of about 1 to 25% may be supported on the inert carrier. The amount of catalyst which may be added to the rosin material may be varied over a wide range but usually is added in an amount to give a catalyst to rosin ratio of about 1:5,000 to about 1:250,000 and preferably of about 1:50,000 to 1:100,000. The rosin to noble metal ratio required will vary with the rosin used as the starting material. For example, N wood rosin might require a ratio of about 1:25,000 to 1:100,000 whereas a distilled rosin would require a ratio of only about 1:75,000 to 1:250,000. On the other hand, very dark rosins might require ratios of 1:5,000 to 1:25,000.

The reaction in accordance with this invention may be carried out at a temperature of about 260° C. to about 350° C. and preferably is carried out at about 315° C. to about 335° C. That the disproportionation reaction will take place along with the nitrile formation is very surprising since a relatively high temperature is required for the nitrile formation, which temperature is considerably above that desirable for disproportionation. In fact a temperature within the above range is normally avoided for a disproportionation reaction because the rosin acid in the presence of the hydrogenation catalyst tends to decarboxylate at these temperatures. However, in the presence of ammonia the disproportionation proceeds smoothly at the higher temperatures and at the same time the carboxyl group is converted to the nitrile group. It might be expected that a higher yield of nitrile and less decarboxylation would be obtained by starting the reaction at a lower temperature and, after disproportionation, raising the temperature to the optimum for nitrile formation. However, as may be seen from the foregoing examples, this is not the case since an equally high or higher yield is obtained, and in less time, when the temperature is raised directly to the optimum for nitrile formation.

Any convenient form of apparatus may be used in carrying out the process. The apparatus should be designed to facilitate the rapid removal of water as fast as it is formed. By carrying out the reaction in such a manner that the water may be removed as rapidly as it is formed, the use of a dehydration catalyst is avoided. The use of the vertical column as described in the foregoing examples is advantageous in that it enables the rapid removal of the water without loss of the nitrile. The column may be packed with a dehydrating agent such as silica gel, if desired, but is equally effective without the use of such a dehydrating agent. It is usually desirable to maintain this column at a temperature of at least 100° C. so that no condensation of the water vapor can occur and be returned to the reaction vessel.

In carrying out the reaction of this invention, the rosin, rosin acid, or other rosin-containing material is contacted, in the liquid phase, at an elevated temperature with the noble metal catalyst and ammonia. If desired, the rosin may be dissolved in an inert solvent in order to provide intimate contact of the rosin with the catalyst and ammonia. However, the reaction is easily carried out in the absence of a solvent by adding the catalyst to molten rosin and then passing in the ammonia. The use of a sparge tube usually provides for sufficient contact between the ammonia and rosin material. The amount of ammonia used in the reaction will depend upon the efficiency of the ammonia-rosin contact. In any event, it should be at least the quantity necessary to react completely with the rosin acids present. The reaction may be carried out under pressure or under a slight vacuum but is conveniently carried out at atmospheric pressure. If desired, the ammonia gas may be diluted with an inert gas such as nitrogen.

The ammonia is passed into the rosin-catalyst mixture until the reaction is essentially complete as indicated by the lowering of the acid number to approximately zero. At the same time the disproportionation reaction will also have been essentially completed.

The nitrile may be isolated from the reaction mixture by distillation in vacuo. Usually it is preferable to neutralize any unreacted acid before distillation. This may be done by adding the theoretical amount of an inorganic alkali such as sodium hydroxide, potassium hydroxide, calcium hydroxide, etc., or the unreacted acid may be extracted from the reaction mixture by means of an aqueous alcoholic solution of alkali.

By carrying out the reaction in accordance with this invention, it is possible to prepare the nitrile of a disproportionated rosin and at the same time do so in an economical one-step process. The product produced by this process is particularly useful for the preparation of disproportionated rosin amine, an important product for use in detergents, wetting agents, fungicides, etc.

What I claim and desire to protect by Letters Patent is:

1. The process of preparing the nitrile of a disproportionated rosin which comprises reacting rosin in liquid phase at a temperature of about 260° C. to about 350° C. with gaseous ammonia in the presence of a noble metal hydrogenation catalyst.

2. The process of preparing the nitrile of a disproportionated rosin which comprises reacting rosin in liquid phase at a temperature of about 260° C. to about 350° C. with gaseous ammonia in the presence of a noble metal hydrogenation catalyst and continuously removing the water from the reaction mixture as it is formed.

3. The process of preparing the nitrile of a disproportionated rosin which comprises reacting rosin in liquid phase at a temperature of about 315° C. to about 335° C. with gaseous ammonia in the presence of a noble metal hydrogenation catalyst.

4. The process of preparing the nitrile of a disproportionated rosin which comprises reacting rosin in liquid phase at a temperature of about 315° C. to about 335° C. with gaseous ammonia in the presence of a noble metal hydrogenation catalyst and continuously removing the water from the reaction mixture as it is formed.

5. The process of preparing the nitrile of a disproportionated rosin which comprises reacting rosin in liquid phase at a temperature of about 315° C. to about 335° C. with gaseous ammonia in the presence of a palladium catalyst.

HAROLD M. SPURLIN.

REFERENCES CITED

The following references are of record in the file of this patent:

UNITED STATES PATENTS

| Number | Name | Date |
|---|---|---|
| 2,154,629 | Littmann | Apr. 18, 1939 |
| 2,373,290 | Campbell | Apr. 10, 1945 |
| 2,461,349 | Ralston | Feb. 8, 1949 |

OTHER REFERENCES

Fleck et al., "Journal Amer. Chem. Soc.," vol. 60, pp. 921–925.